Oct. 15, 1957     R. H. PECK     2,810,065

AIRCRAFT LIGHT

Filed June 14, 1955

Richard H. Peck
INVENTOR.

BY *[signatures]*
Attorneys

United States Patent Office 2,810,065
Patented Oct. 15, 1957

2,810,065

AIRCRAFT LIGHT

Richard H. Peck, Owensboro, Ky.

Application June 14, 1955, Serial No. 515,320

2 Claims. (Cl. 240—7.7)

This invention relates generally to signal lights, and is more particularly concerned with a rotating signal light positioned on a moving vehicle wherein the passage of air past the vehicle results in rotating the light, the speed of which aids in determining the relative speed of said vehicle.

A further object of invention in conformance with that set forth above is to provide a self-propelled rotating signal light which aids in more distinctively identifying aircraft and other such vehicles during movement, as well as providing a highly utilitarian and relatively economical signal light as will subsequently become apparent.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Indicated generally at 10 is the novel rotatable signal light which includes a dome-shaped glass element 12 rotatably carried on a support surface 14 which may be a portion of the tail or fuselage of an aircraft.

Figure 1:
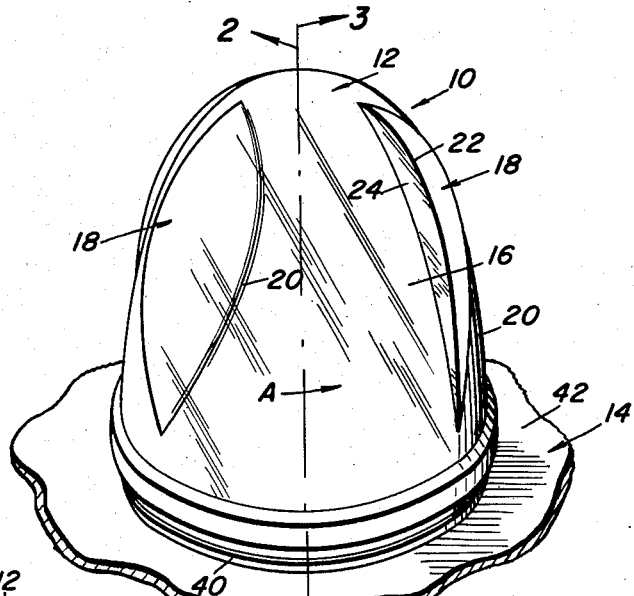
Figure 1 is a perspective view illustrating the rotatable signal light in position on a portion of the support surface of a vehicle.
Figure 2:
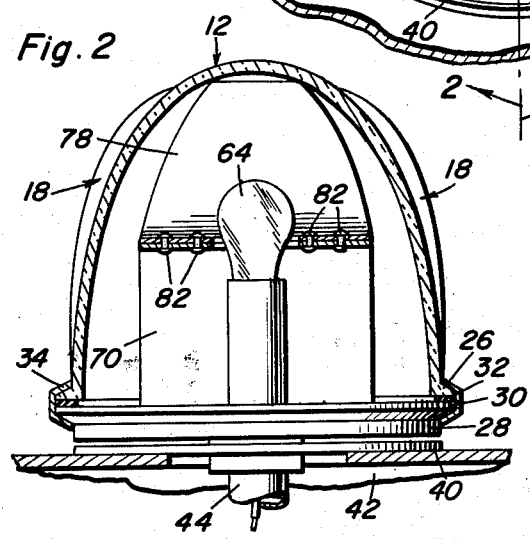
Figure 2 is a sectional view taken substantially on line 2—2 of Figure 1.

The dome 12 includes on its outer surface 16 a plurality of vertical spaced ribs 18 which are hollow and transparent, open into the globe 12 and may be cast therein, and each of which includes a leading edge 20 inclining from the surface 16 upwardly and rearwardly to a raised rear edge 22 and thence sharply downward defining the shoulder 24 substantially perpendicular to the dome. Thus it is believed readily apparent that air passing over the outer surface 16 of the glass dome will come in contact with the shoulders 24 of the protrusions 18 resulting in rotation of the dome as indicated by the arrow A in Figure 1 and resistance to rotation of the dome 12 will be reduced to a minimum by the inclined leading edges 20.

It is to be understood that the dome will be a red light, however, any suitable color such as green, yellow, etc. may be utilized in this construction.

Figure 4:
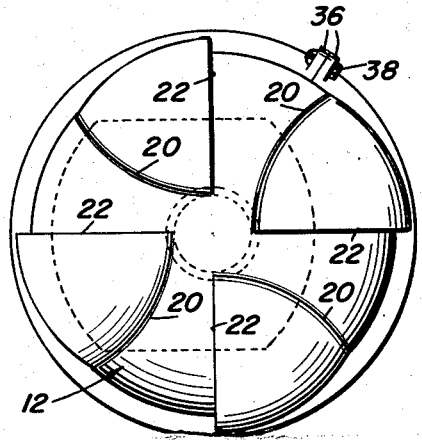
Figure 4 is a top plan view of the novel rotatable signal light.

The dome 12 includes on its lower edge an outwardly extending circumferential flange 26 which rests upon a base plate 28 having a circumferential flange 30, the flanges 26 and 30 having interposed therebetween a suitable sealing gasket 32. Contacting the outer peripheral edges of the flanges 28 and 30 is a U-cross section clamping ring 34 which includes angular ear portions 36, see Figure 4, and the ends thereof which are secured together by means of a suitable clamping bolt and nut assembly 38.

A mounting plate 40 is secured to a support surface, such as the aircraft fuselage, indicated at 42, said mounting plate having extending therethrough a tubular light socket and support shaft 44 which is retained to said mounting plate by means of an annular collar 46 secured on the lower surface of said mounting plate in any suitable manner, and retained thereon by means of a transverse set screw 48. A thrust bearing assembly 50 has its outer bearing race 52 fixedly secured in a suitable aperture 54 in the base plate 28, the inner race 56 being secured to the support shaft 44. Thus rotation of the dome results in rotation of the outer bearing race and base plate 28 relative to the fixed inner bearing race 56. A suitable spacer 58 is provided between the mounting plate 42 and the inner race 56, and an annular collar 60 is provided on the upper surface of the bearing race 56 for properly orienting the various elements when assembled.

The bulb socket member 44 includes therein a spring compressed socket 62 which is conventional, it not being believed necessary to be described in detail, the bulb 64 being disclosed as the type having radially extending pins cooperating with the socket assembly 62.

A single electrical conducting wire 66 is operatively connected to the bulb 64 through suitable switch mechanisms, not shown, only a single wire being necessary inasmuch as a suitable ground 68 will be provided between the vehicle upon which the light is mounted and the socket 44.

Figure 3:
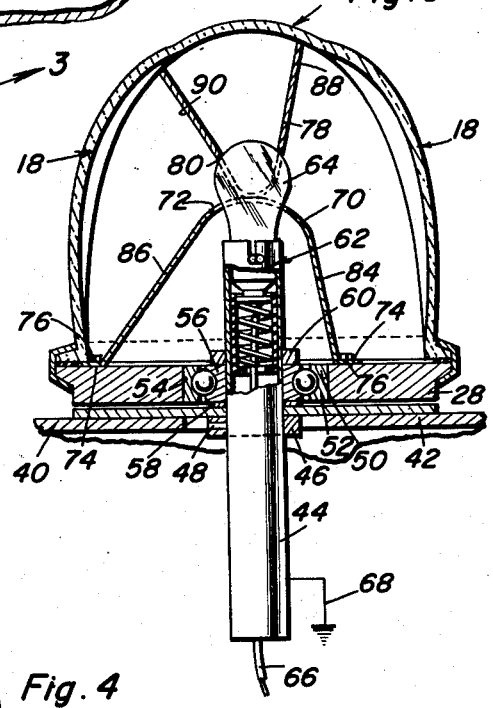
Figure 3 is a sectional view taken substantially on line 3—3 of Figure 1.

Mounted on the upper surface of the base plate 28 is a first reflector 70 having a central aperture 72 through which the bulb extends, see Figure 3, the reflector having suitable lower flange portions 74 which are connected to the base plate by screws 76, for example. A second reflector 78 including a central aperture 80 extending over an upper portion of the bulb 64, is secured longitudinally to the lower reflector 70 by means of rivet elements 82, for example. It will be noted that the sides 84 and 86 of the first reflector 70 are each at a different angle relative to the bulb 64 and the sides 88 and 90 of the upper reflector or at still different angles relative to said bulb. This angular relation of the bulb relative to the light source results in an admission of light at different angles thus making the aircraft more readily noticeable and perceivable when observed. Furthermore, due to the various angles of emission of light from the rotating light, it will be easier to determine the speed of rotation thereof, thus being able to more closely approximate the speed of movement of the aircraft or vehicle.

Various positional directional terms such as "top," "bottom," "side," etc., are utilized herein to have only a relative connotation to aid in describing the device and are not intended to be interpreted as requiring any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a rotating light actuated by the wind stream of a moving vehicle, a mounting plate securable to a support surface, a support shaft and light socket member extending through said mounting plate, a thrust bearing concentrically disposed on said support shaft, a rotating base plate concentrically disposed on said thrust bearing, a colored light emitting dome sealingly secured on an upper surface of said base plate in vertical position, an electric light bulb assembly supported by said socket member within said dome, means for supplying electrical current to said light bulb, means integral with an outersurface portion of said dome for engagement by a wind current for rotating said dome on the thrust bearing, and first and second light reflectors in said dome for disseminating emitted light rays through said dome at different angles, said first reflector comprising planar sides at opposite sides of the light bulb diverging downwardly relatively therefrom, the second reflector comprising planar sides at opposite sides of the light bulb diverging relatively upwardly therefrom, each of said planar sides extending from the light bulb at a different angle than the others.

2. In a rotating light as set forth in claim 1 wherein said dome includes a plurality of transparent wind responsive ribs extending vertically on the outersurface thereof, each of said ribs being hollow and opening into said dome and including a leading edge portion inclining upwardly and rearwardly from the outer surface of said dome and terminating in a trailing shoulder portion perpendicular to the outer surface of said dome.

References Cited in the file of this patent

UNITED STATES PATENTS

| | | |
|---|---|---|
| 346,758 | Loper | Aug. 3, 1886 |
| 440,206 | Smith | Nov. 11, 1890 |
| 1,612,703 | Crowe | Dec. 28, 1926 |
| 1,778,861 | Magni | Oct. 21, 1930 |
| 1,928,329 | Coffin | Sept. 26, 1933 |
| 2,740,103 | Gosswiller | Mar. 27, 1956 |
| 2,748,371 | Wilcox et al. | May 29, 1956 |